United States Patent [19]
Rowan

[11] Patent Number: 5,596,277
[45] Date of Patent: * Jan. 21, 1997

[54] METHOD AND APPARATUS FOR DISPLAYING SIGNAL INFORMATION FROM A METAL DETECTOR

[75] Inventor: Mark D. Rowan, Lebanon, Oreg.

[73] Assignee: White's Electronics, Inc.

[ * ] Notice: The term of this patent shall not extend beyond the expiration date of Pat. No. 5,523,690.

[21] Appl. No.: 485,810

[22] Filed: Jun. 7, 1995

Related U.S. Application Data

[62] Division of Ser. No. 918,075, Jul. 24, 1992, Pat. No. 5,523,690.

[51] Int. Cl.$^6$ .............................. G01N 27/72; G01V 3/11; G01V 3/165; G01R 27/26
[52] U.S. Cl. ........................................ 324/329; 324/262
[58] Field of Search ...................... 324/326, 327, 324/328, 329, 233, 228, 226, 262

[56] References Cited

U.S. PATENT DOCUMENTS

| | | | |
|---|---|---|---|
| 3,648,270 | 3/1972 | Metz et al. | 340/324 A |
| 3,848,182 | 11/1974 | Gerner et al. | 324/40 |
| 4,507,612 | 3/1985 | Payne | 324/329 |
| 4,631,533 | 12/1986 | Mark, Jr. | 340/271 |
| 4,742,339 | 5/1988 | Baziuk | 340/568 |
| 4,853,617 | 8/1989 | Douglas et al. | 324/67 |
| 4,868,910 | 9/1989 | Maulding | 324/233 |
| 5,148,151 | 9/1992 | Podhrasky | 340/572 |

FOREIGN PATENT DOCUMENTS 3228447  2/1984  Germany.

*Primary Examiner*—Walter E. Snow
*Attorney, Agent, or Firm*—Chernoff, Vilhauer, McClung & Stenzel

[57] ABSTRACT

A metal detector having a receive signal responsive to detected metal objects and having a display panel that can simultaneously display a plurality of phase angles associated with the receive signal. Additionally, the display panel can simultaneously display a second variable associated with the receive signal at each particular phase angle. The second variable is user selectable and can be either (1) a count of the number of times the signal amplitude exceeds a predetermined threshold level at a particular phase angle or (2) the signal amplitude when the signal is at a particular phase angle.

10 Claims, 6 Drawing Sheets

GOOD TARGET

IRON

GOOD TARGET

IRON ALLOY

GOOD TARGET

FOIL

METHOD AND APPARATUS FOR DISPLAYING SIGNAL INFORMATION FROM A METAL DETECTOR

This is divisional of application Ser. No. 07/918,075 filed on Jul. 24, 1992, now U.S. Pat. No. 5,523,690.

FIELD OF INVENTION

The present invention relates to the field of metal detectors, and more particularly to a means of graphically displaying bivariate signal information that reflects signal characteristics responsive to metal objects which pass beneath a search head of the metal detector.

BACKGROUND OF THE INVENTION

An induction balanced metal detector, of the type used to locate coins, rings and other treasure buried in soil within a few feet of the surface, has a search head that houses a transmit coil and receive coil. The metal detector has circuitry that transmits a periodic signal to the transmit coil as the search head is manually swept over a ground surface to detect buried metal objects. When the transmit coil passes over a metal object, a signal is generated in the receive coil due to perturbations in the magnetic field which cause the AC inductive coupling between the transmit and receive coils to become unbalanced. These receive coil signals are responsive to target characteristics such as size, depth below the ground surface, orientation with respect to the search head, and type of metal. In order to provide the user with information about the target's characteristics, (e.g., to distinguish coins from nails), some metal detectors measure the phase angle between the transmitted signal and the received signal. This phase angle is typically displayed to the user as a number on an output device such as an analog meter or a liquid crystal display (LCD). Under ideal conditions this phase angle can provide the user with accurate information regarding the target.

However, in actual practice the phase angle information is materially affected by ground mineralization and can also be affected by the target's orientation with respect to the search head. Under either of these conditions a single sweep of the search head can, with conventional displays, produce multiple phase angle readings and thereby result in an indecipherable output. In response to this problem some metal detector designers have also provided an audio output of the received signal where the tone's frequency corresponds to the phase angle of the signal and the tone's volume corresponds to the signal strength. An example of the prior art which uses a numeric LCD to display phase angle information and which also has an audio output is Maulding, U.S. Pat. No. 4,868,910, assigned to the assignee of this invention. This recent prior art approach provides the user with more complete information regarding phase angle and signal strength, but suffers in that the information cannot be latched for careful analysis and it also depends upon the user's audio memory and ability to discern frequencies in order to determine the target's characteristics.

SUMMARY OF THE INVENTION

The present invention solves the above problems by providing a bivariate visual display of two variables that are associated with a signal induced in the receive coil of a metal detector. The two variables are: (1) the receive signal's phase angle (with respect to the transmit signal) and (2) the choice of either (a) a count of the number of occurrences in which the signal amplitude exceeds a predetermined amplitude (hereinafter, the signal count) or (b) the signal amplitude. The bivariate information is displayed on a suitable graphic device such as an LCD. This method permits the metal detector operator to readily make a visual discrimination between valid phase angle readings that represent good target information and those that are due to extraneous, non-target magnetic field perturbations.

The principal objective of the present invention is to provide a metal detector having a bivariate visual display of two signal characteristics that are representative of a target object.

It is a further objective of the present invention to provide an improved metal detector in which (a) the phase angle between the transmit and receive signals is determined only when the signal strength exceeds a predetermined level and (b) the number of times the signal amplitude exceeds the predetermined level at a predetermined range of phase angles is counted, and then simultaneously displaying both the phase angle and signal count on a visual display device.

It is a still further objective of the present invention to provide a metal detector that measures the phase angle between the transmit signal and receive signal when the signal strength exceeds a predetermined level by displaying the phase angle and received signal strength simultaneously on a visual display device.

The foregoing and other objectives, features and advantages of the present invention will be more readily understood upon consideration of the following detailed description of the invention taken in conjunction with the accompanying drawings.

Appendix A is a source code listing of the subroutine REPORT.

DESCRIPTION OF THE PREFERRED EMBODIMENT

This invention pertains to improvements in the display of signal information generated within induction balance type metal detectors. A metal detector of this type is fully described in Maulding, U.S. Pat. No. 4,868,910 which is incorporated herein by reference for purposes of providing a complete disclosure. Before proceeding to the preferred embodiment of the present invention, it is first necessary to generally describe the operation of an induction-balanced metal detector which will be done with reference to Maulding.

An induction-balanced metal detector generally has a search head with two AC coupled, electrically conductive coils: a transmit coil and a receive coil. Maulding describes a search head with three coils; transmit, receive and a feedback coil; however, the feedback coil is not relevant to the present disclosure. (See Maulding, FIG. 1, Nos. 22, 24 and 26.) To search for buried targets, a periodic signal is applied to the transmit coil as the search head is swept over an area of ground. Under ideal conditions, i.e. proper induction balance and no magnetic field perturbations, there is no signal in the receive coil. However, when the search head passes over a target it causes a disturbance in the transmit coil's magnetic field, thereby inducing a signal in the receive coil. The transmit and receive signals are then electronically processed and applied to various output devices in an effort to measure and communicate various target characteristics. As exemplified in Maulding, the signals are processed into six components; XD, XF, YD, YF, GD and GF. Only the filtered signals XF, YF and GF are relevant to the present application. XF and YF are DC phase quadrature components of the receive and transmit signals and GF is a filtered DC signal representation of the ground mineralization effects. (See Maulding, FIG. 1 where 52, 56 and 78 represent signals XF, YF and GF, respectively.) From the XF and YF components, a receive signal phase angle is measured which is representative of the target's characteristics. (Maulding, FIGS. 2, 3; Col. 9, lines 35–50; and Col. 21, lines 27–50.) This phase angle information discloses characteristics such as type of metal, size, orientation of a ferromagnetic object with respect to the search head, and ground mineralization.

Figure 1:
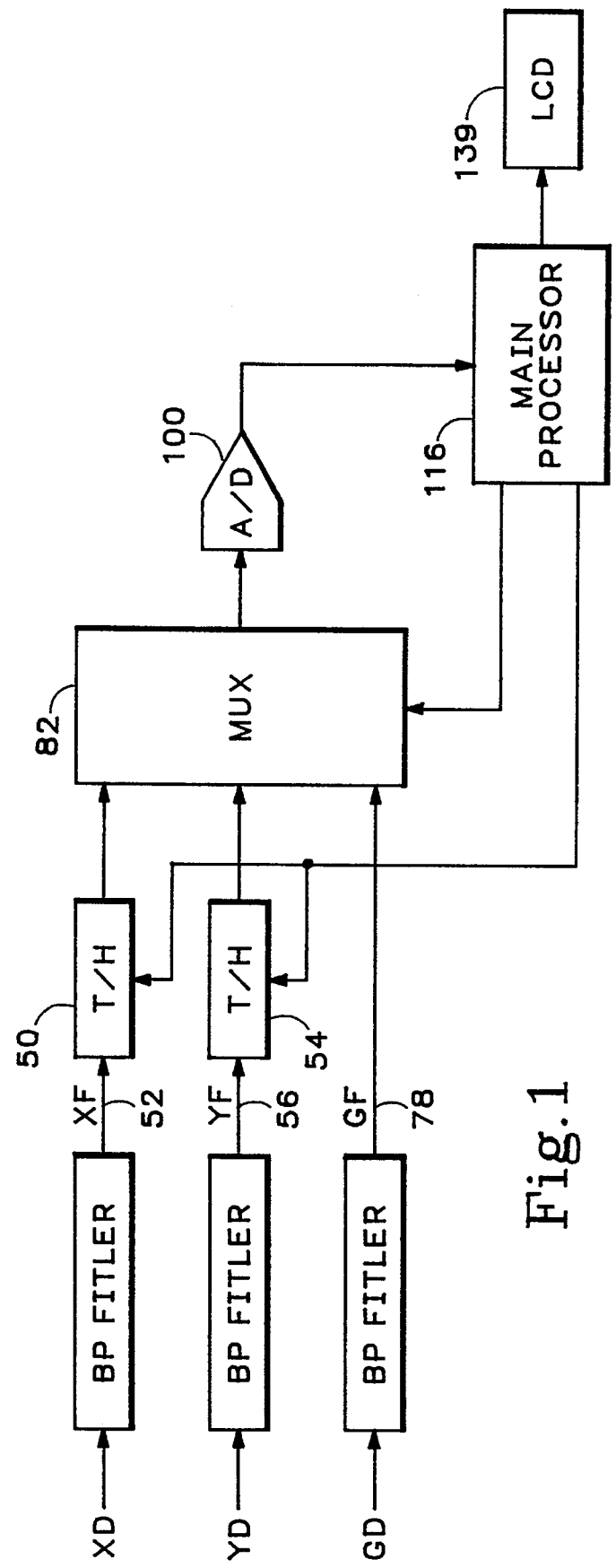
FIG. 1 is a block diagram of a portion of an exemplary metal detector circuit of the present invention.

FIG. 1 of this application shows the components of Maulding's circuit which are also in the present invention. (The reference numbers in FIG. 1 correspond to Maulding reference numbers for identical component blocks.) All the reference elements in FIG. 1 are also represented in Maulding with the important exception of LCD 139 which is materially distinct from Maulding's LCD 138.

With reference to FIG. 1, it can be seen that signals XF and YF emerge from respective band pass filters 42, 46 and are applied to respective track and hold circuits 50 and 54. Thereafter, signals XF and YF are applied to a multiplexor (MUX) 82. The signal GF emerges from a band pass filter 74 and is thereafter applied directly to MUX 82.

Reading a signal is a two-step process and fully described in Maulding (Col. 18, line 25 to Col. 19, line 3). In essence, the main processor 116 simultaneously commands track and hold circuits 50, 54 to hold the respective XF and YF signals so that the signals which are later sequentially input into the MUX represent XF and YF signals that are sampled at the same instant in time. The main processor 116 then directs MUX 82 to route selected signals to the MUX output in a predetermined sequence at a fixed sampling rate of approximately 7.5 milliseconds. The signals coming out of the MUX are applied to an analog-to-digital converter system 100 and then applied to the main processor 116. At this point the present system is different from Maulding in that the main processor then writes the information to LCD 139 in a suitable format using onboard software programming described hereinafter.

Figure 2A:
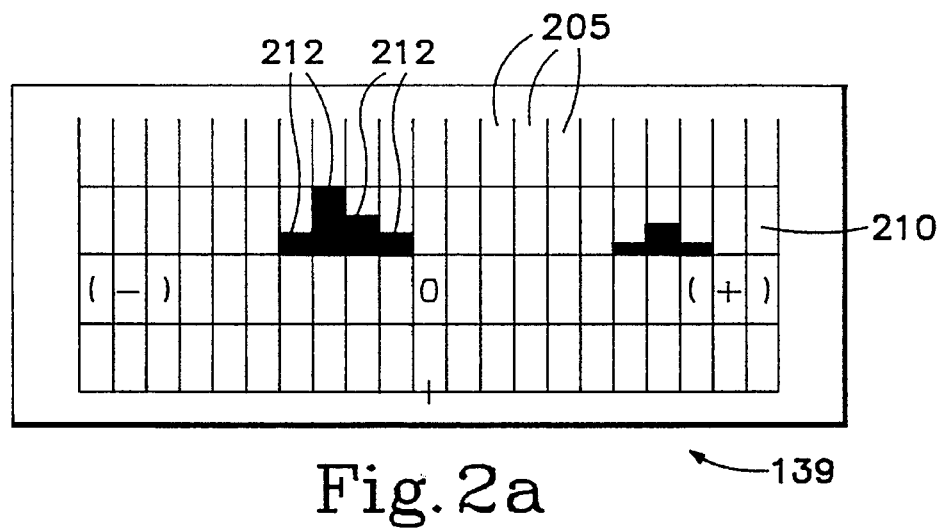
FIGS. 2a–2g show exemplary embodiments of a bivariate graphic display of the present invention showing signal information associated with a metal detector.

FIG. 2a represents a preferred embodiment of the bivariate graphical display of the present invention showing two variables of signal information displayed on LCD 139. There is a horizontal scale that is divided into a series of evenly-spaced divisions 205, each division represents a range of phase angles. A preferred embodiment of the present invention that is generally commercially available is a LCD having a 4×20 character display, which means, that the horizontal axis can display 20 characters and the vertical scale can display four characters, with each character representing a range of values.

In the preferred embodiment of the display shown in each of FIGS. 2a–2g, the horizontal scale represents the relative phase angle. Each division represents a range of phase angles: where the possible range of phase angles is 180° then each division along the horizontal scale of a 4×20 LCD would represent a 9° range of phase angles. The vertical scale 210 represents a second variable which is either (1) a signal count or (2) an amplitude of the receive signal.

The signal count is a running tabulation of the number of times that a signal having a particular phase angle exceeds a predetermined threshold amplitude (e.g., the number of times that a signal with a phase angle between +20 and +29 exceeds a signal strength of 0.08 volts). Either the user or the main processor 116 selects the threshold amplitude to filter out weak signals. Each time a signal amplitude exceeds the threshold amplitude the associated phase angle is measured and the signal count for that phase angle is incremented.

The alternate variable displayed on the vertical scale is the amplitude of the receive signal. Only information associated with phase angles whose amplitude exceeds the predetermined threshold level is displayed.

The individual characters 212 used to represent the bivariate information are user definable characters which are bit-mapped into a five by eight matrix within the main processor 116 and downloaded to the LCD. The standard configuration displays the signal information as a bar graph, with a bar at respective phase angle ranges and the height of the bar is proportional to the signal count or signal amplitude (the bar height is zero where no signals correspond to a given range of phase angles).

Figure 2B:
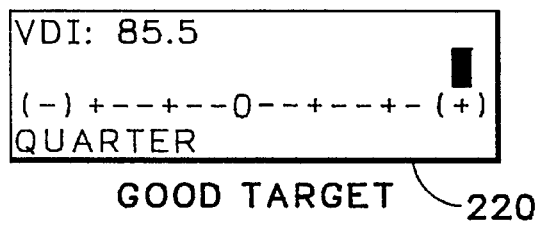
Figure 2E:
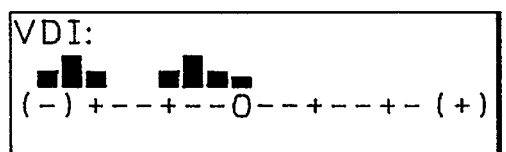
Figure 2C:
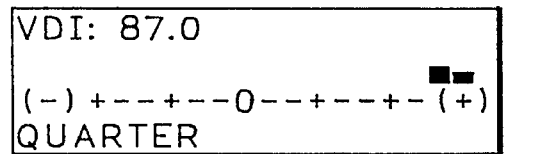
Figure 2F:
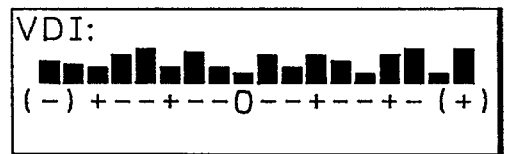
Figure 2D:
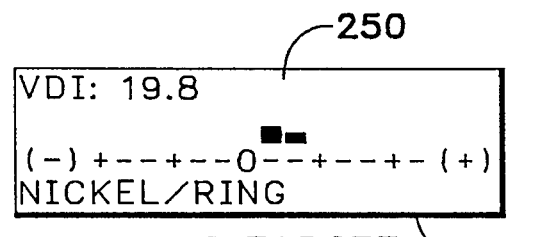

FIGS. 2b–2g are examples of the LCD display when the search head encounters various buried metals. FIGS. 2b–2d represent the display in response to "good targets," that is, targets that the metal detector user may want to dig up. Good target displays are characterized by a tight grouping of bars within a narrow range of phase angles, or optimally at a single phase angle range as shown in FIG. 2b. Additionally, good targets are characterized by groupings in the positive portion of the graph; i.e., the area between the "0" and "(+)" symbols. The exemplary embodiments of FIGS. 2b–2d also show other information on the LCD such as the VDI, which is a numeric representation of the phase angle, and a textual estimate of the target, e.g., "quarter" in FIG. 2b.

Figure 2G:
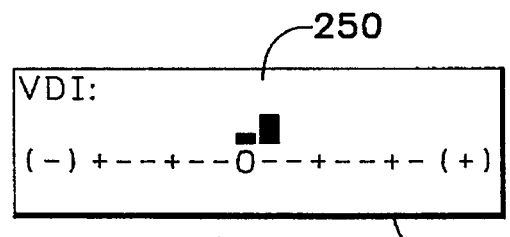

FIGS. 2e–2g are exemplary embodiments of the display when the search head encounters undesirable (i.e., nonvaluable) metal targets. These graphs display signal information having phase angles that are predominately in the negative portion of the graph (between "0" and "(−)") and which typically show a signal response at a wide range of phase angles rather than the tight grouping associated with goods targets. The bivariate display is particularly helpful in deciphering those signals that are spread across a wide range of phase angles, as is shown in FIG. 2f. If the display were monovariate (e.g., a numeric LCD), the user would not be able to distinguish good targets from bad because the numeric LCD would be as likely to show a phase angle associated with a good target as with a bad one. But the bivariate display of the present invention shows the signal information as a "smear" across the display, thereby clearly communicating to the user that the target is not desirable.

The advantage of the bivariate display is also apparent in a comparison of FIG. 2g with FIG. 2d. A monovariate display would likely indicate the same phase angle for each of these targets, namely the phase angle associated with the division 250 to the immediate right of the center because the largest bar is at that location. However the bivariate display of the present invention shows information on multiple phase angles and the good target FIG. 2d has a bar to the positive side whereas the undesirable target FIG. 2g has a bar to the negative side of the largest bar. A user familiar with these displays will recognize the more positive phase angles as indicative of a good target.

Figure 3:
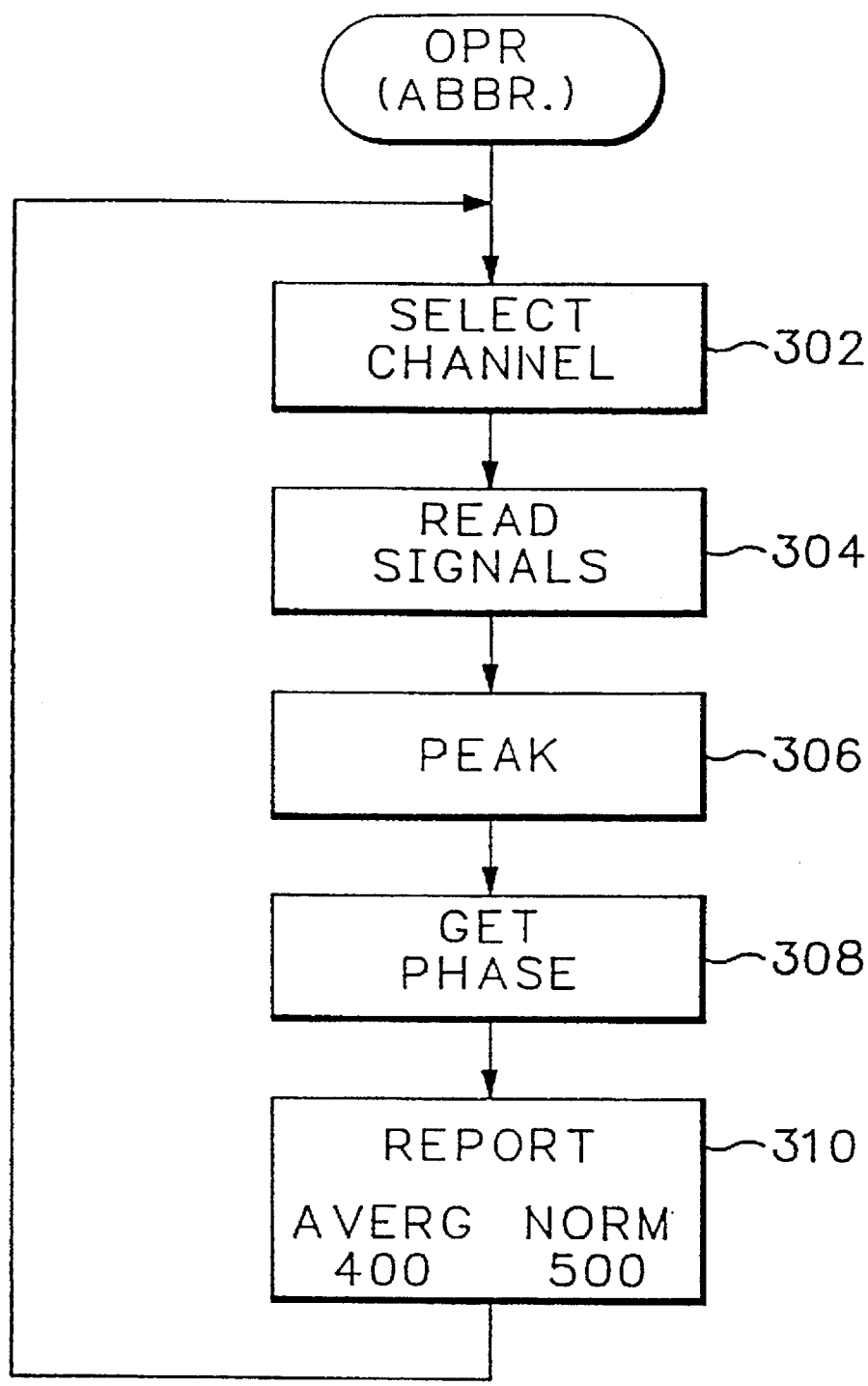
FIG. 3 is an abridged flow diagram of an exemplary software routine for processing the signals associated with the metal detector.

FIG. 3 is an abridged software flow diagram representing the steps performed by the main processor during operation of the metal detector. A more complete flow diagram showing all steps necessary for operation of a metal detector is shown in Maulding, FIG. 11. Continuing with FIG. 3 of the present invention, steps 302 and 304 represent channel selection and signal reading wherein the main processor 116 instructs the MUX 82 to route a selected channel to the MUX output pin. After reading the signals 304, the next step calls software subroutine PEAK 306, which determines whether signal GF has reached a local maximum value. (Subroutine PEAK is exemplarily shown in Maulding FIG. 16.) A "local maximum" is one that occurs within a predetermined period of time. When the main processor determines that GF has reached a local maximum, a flag "PK" is set. The next step, subroutine GETPHASE 308, calculates the phase of the receive signal from XF and YF and stores the result in a memory register "PHASE." (GETPHASE is exemplarily shown in Maulding, FIG. 18.) After GETPHASE, the software calls subroutine REPORT 310 which checks the status of flag PK and writes the signal information to the LCD when flag PK is set. (The subroutine REPORT 310 is novel to this invention and has no equivalent in Maulding.) Software module REPORT utilizes one of two routines AVERG (FIGS. 4 and 5) or NORM (FIG. 6).

Figure 4:
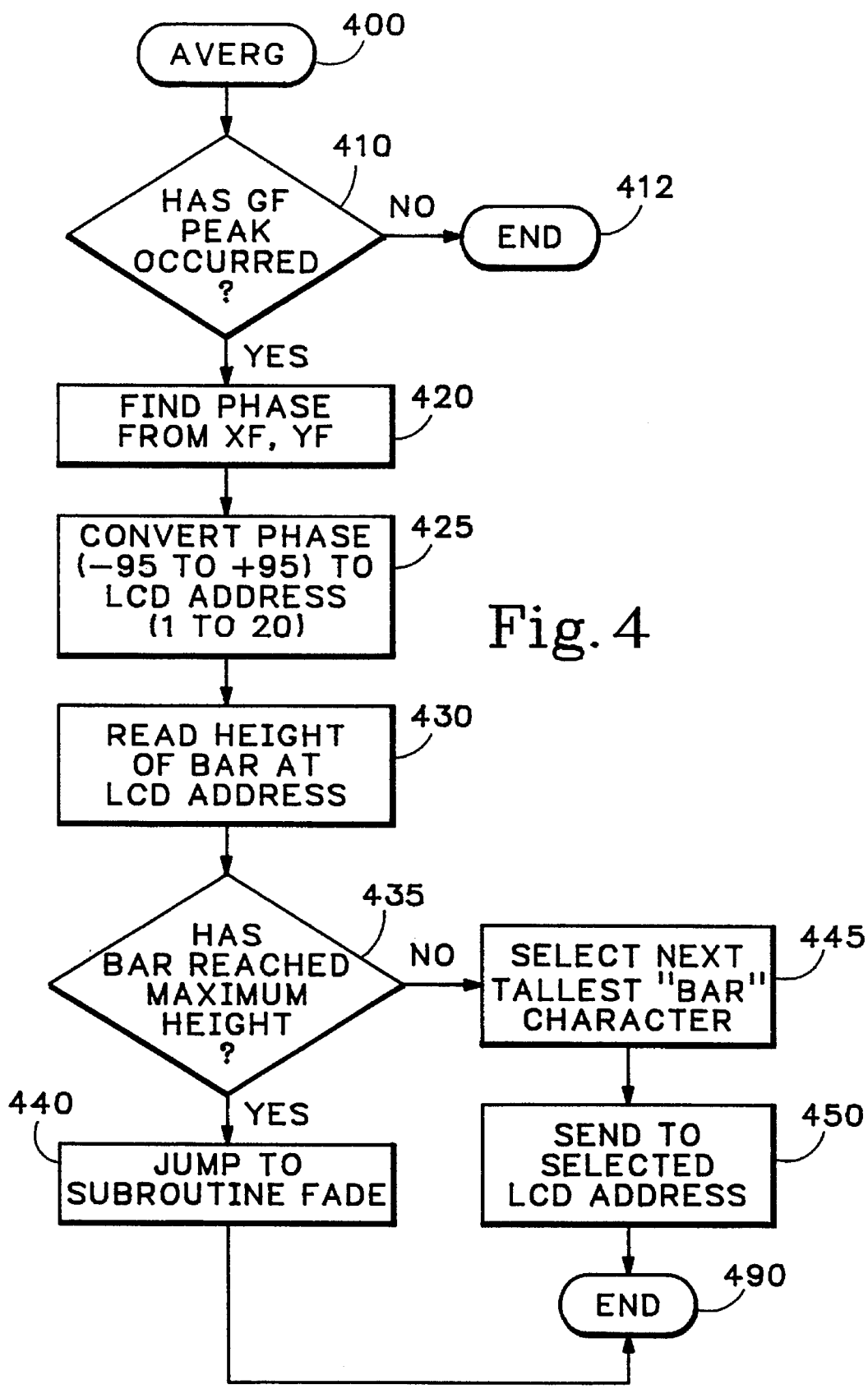
FIG. 4 is a flow diagram of an exemplary software routine that writes phase angle and signal count to the graphic display of FIG. 2.

The REPORT subroutine checks a flag "MP" to determine whether the user has selected the display mode which shows the signal count or the signal amplitude. If the user selects the signal count display, then the subroutine REPORT will branch to a routine AVERG (FIG. 4). Alternatively, if the user selects the amplitude display, then REPORT will branch to the routine NORM (FIG. 6). AVERG and NORM could be subroutines, but in the preferred embodiment they are code within the subroutine REPORT.

FIG. 4 is an exemplary flow diagram of AVERG 400 which writes signal information to the LCD. This routine determines whether a local maximum in the signal amplitude has occurred at step 410 by testing whether flag PK has been set. If PK is not set then the routine exits at 412. If flag PK is set then the routine gets the phase angle in step 420 from the memory register PHASE. In step 425 the routine converts the phase angle into an LCD "write" address. As explained above, the preferred embodiment includes a 4×20 matrix LCD display device and the phase angle is represented along the 20-character axis. Therefore, the software program converts the phase angle into a "write" address corresponding to the LCD axis by multiplying the phase angle by 20 and dividing the result by 180, effectively creating 20 ranges of phase angles of nine degrees each. The routine then reads the height of the bar at the LCD address corresponding to the "write" address at step 430 and in step 435 determines whether the bar has reached a maximum height. If the bar has not reached a maximum height then the routine writes the next taller bar character in step 445. Alternatively, if the bar is at a maximum height then the routine calls FADE at step 440.

Figure 5:
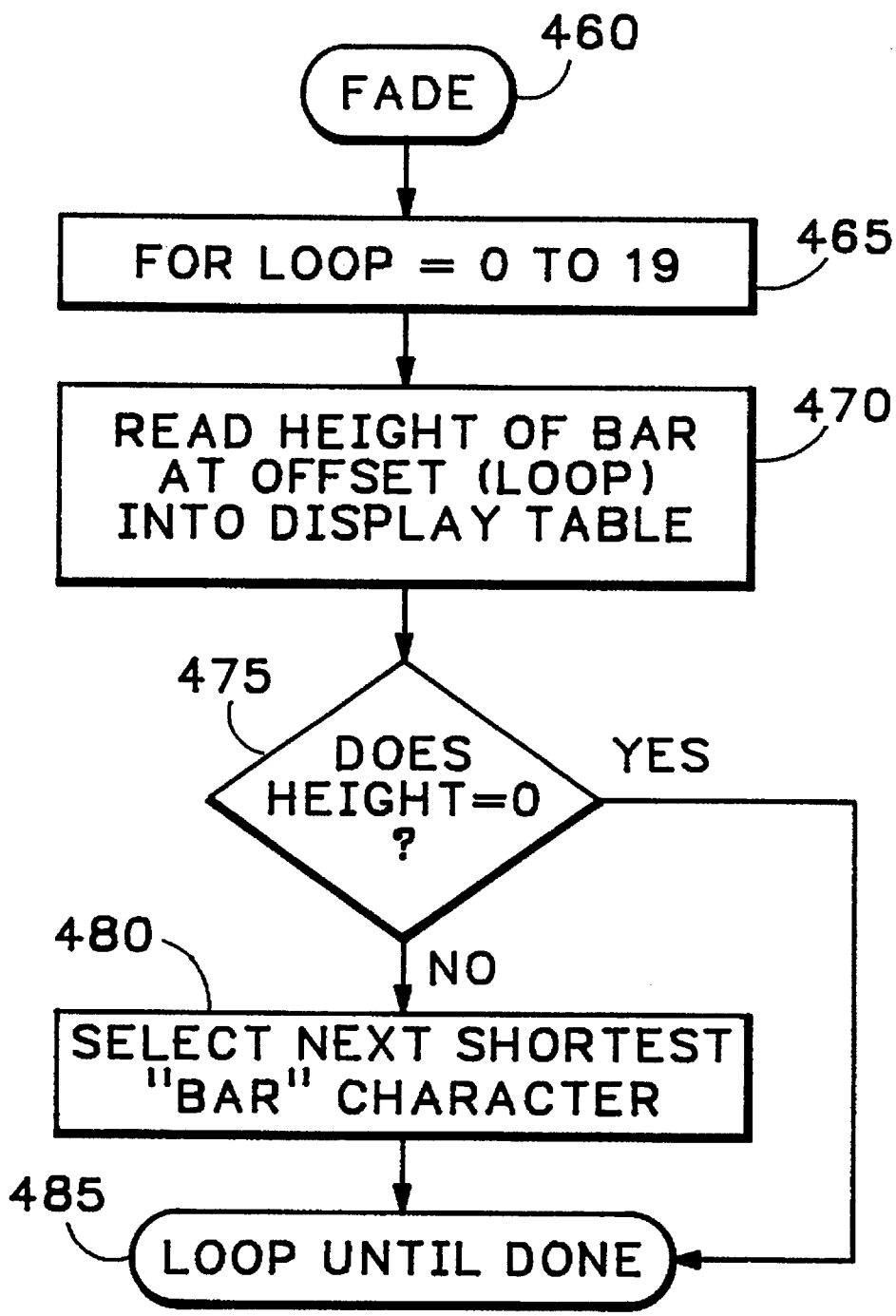
FIG. 5 is a flow diagram of an exemplary software subroutine that selects a shorter bar character associated with the graphic display device of FIG. 2.
Figure 6:
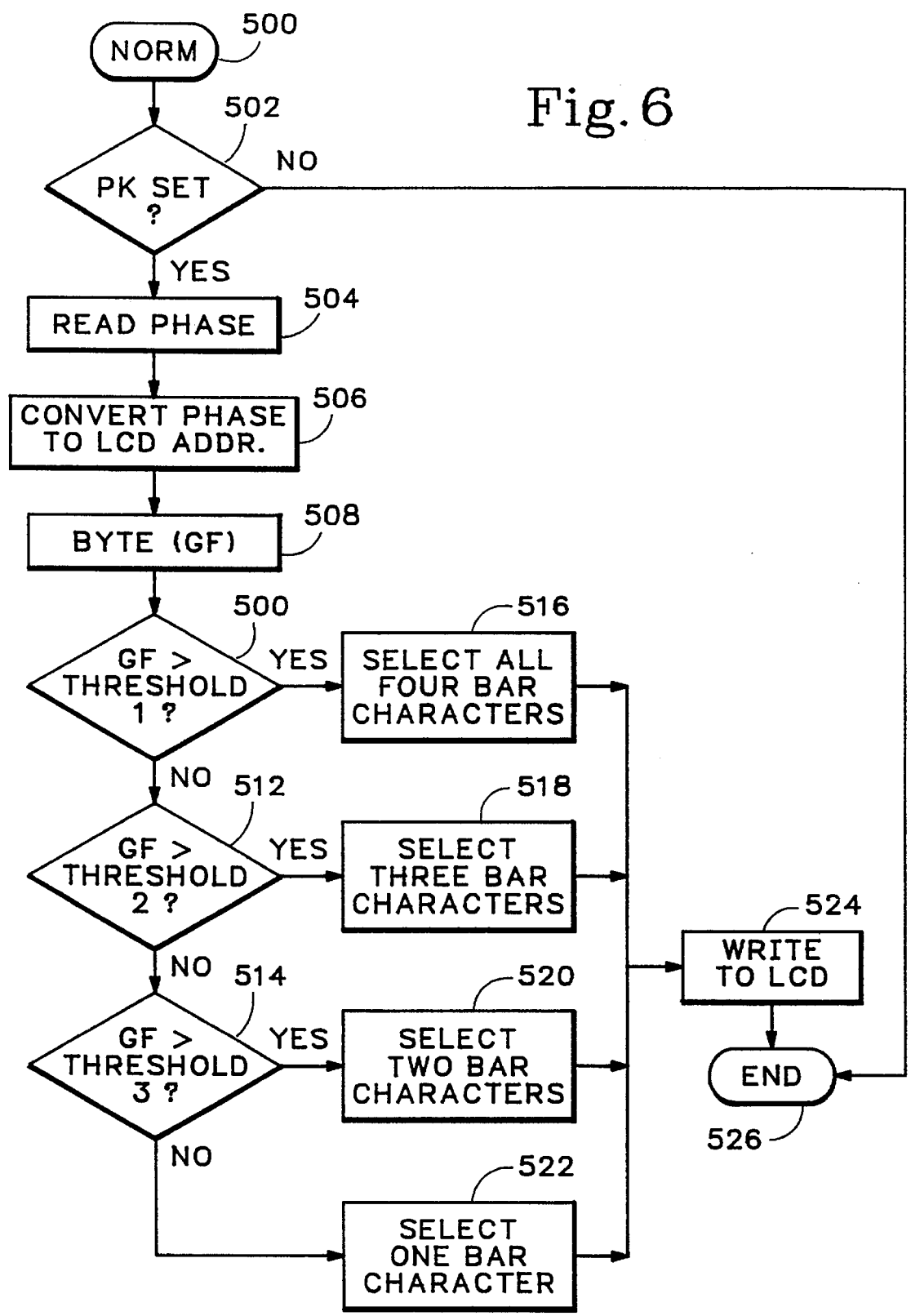
FIG. 6 is a flow diagram of an exemplary software routine that writes phase angle and amplitude information to the graphic display device of FIG. 2.

FADE 460, FIG. 5, decrements the height of all bars that are at addresses other than the "write" address. FADE loops through 20 iterations, step 465, to read the height of the bar at each address, step 470. If the height of the bar is zero then the subroutine does nothing and loops to the next bar, step 485. If the height of the bar is not zero then the subroutine selects the next shortest bar character at step 480. The sub-routine loops through all the bars until each bar other than the "write" address bar is decremented (or skipped, in the case of zero height bars) at step 485. After completing the 20 iterations the subroutine FADE returns control to AVERG which terminates at step 490.

FIG. 6 is an exemplary flow diagram representation of the routine NORM 500. Upon entering NORM, the program first determines whether a local maximum in the receive signal has occurred at step 502 by testing for the flag PK. If flag PK is not set, the routine terminates at step 526. If flag PK is set, the program gets, at step 504, the phase angle of the receive signal from the memory register and converts the phase angle to an LCD "write" address 1 to 20, step 506, in the same manner as described above for routine AVERG. In the next step, the program runs a subroutine BYTE(GF) to calculate a compressed eight-bit datum representing the GF level which correlates to the receive signal amplitude. (BYTE is exemplarily disclosed in Maulding, FIG. 14.) Thereafter, the routine, at steps 510, 512 and 514, respectively, tests the eight-bit representation of the GF level against three preset, respectively decreasing thresholds designated thresholds 1, 2, and 3. If the GF level is greater than the first threshold 510, then the routine selects all four segments of the bar at step 516. If the GF level is less than threshold 1 but greater than the next lowest threshold 2, step 512, then the routine selects three of the four bar characters at step 518. If the GF level is less than threshold 2 but greater than the lowest threshold 3, step 514, then the routine selects two bar characters at step 520. If the GF level is less than threshold 3 then the routine selects one bar character at step 522. The routine then writes the information to the "write" address at step 524 and exits the subroutine at step 526.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

APPENDIX A

```
2500 A.D. 6805 CROSS ASSEMBLER   -   VERSION 3.01d
---------------------------------------------------

INPUT FILENAME : REPORT.ASM
              OUTPUT FILENAME : REPORT.OBJ

1                       NAM    REPORT  07 FEB 89/modified 7/28/89  MDR
 2              ;**************************************************
 3              ;OUT:TARGET DATA DISPLAYED IN AUDIO AND LCD.
 4              ;CRITERION FOR LEARN = PK
 5              ;CRITERION FOR AUDIO = GFLEV
 6              ;**************************************************
 7                       PUBLIC REPORT
 8                       EXTERN AUDIO ;DOK & GOUT TO AUDW
 9                       EXTERN DISFLT ;DISCRIMINATE FILTER->DOK
10                       EXTERN SET,CLR ;LEARN ROUTINES
11                       EXTERN VDI,VDIAV,AVCOUNT,DISTABL,GDC,GCOUNT,IDTONE
12                       EXTERN PAGE0 STATE,PAGE0 GHOT,PAGE0 DISPTR,PAGE0 KEY
13                       EXTERN PAGE0 STAT ;7=LRNREJ,6=LRNACC       IN
14                                         ;2=PK,3=TRIG,5=DISC      IN
15                                         ;0=DOK                   OUT
16                       EXTERN PAGE0 FLAGA ;3=DON:SET IF ACCEPT    OUT
17                                          ;4=DOK:SET IF DISC ON   OUT
18                                          ;2=ATH                  IN
19                       EXTERN PAGE0 FLAG9 ;6=200H                 OUT
20                                          ;4=SIGN BIT             INT
21                                          ;5=ATIME RUNNING        INT
22                       EXTERN PAGE0 FLAGP ;0=ac overload
23                       EXTERN PAGE0 GFLEV ;DATA FROM PEAK         IN
24                       EXTERN PAGE0 GFAMP ; abs(compressed(GF))
25                       EXTERN PAGE0 DISLEV ;DISC. DATA TO AUDIO   OUT
26                       EXTERN PAGE0 ACSENS ;USED FOR SHIFTS       IN
27                       EXTERN PAGE0 PHASE ;SB                     IN
28                       EXTERN PAGE0 PHRAC
29                       EXTERN PAGE0 TEMA ;STASH                   INT
30                       EXTERN PAGE0 OPTST ;RAM TEST ADDRESS       IN
31                       EXTERN PAGE0 ATIME ;RECOVERY HOLD OFF      INT
32                       EXTERN PAGE0 RECOV ;user adj. hold off
33                       EXTERN PAGE0 VDISENS,PAGE0 FADERATE,PAGE0 FADECOUNT
34                       EXTERN PAGE0 BCREJ
35                       EXTERN PAGE0 SIGBAL
36                       EXTERN PAGE0 STATTABL
37                       EXTERN PAGE0 TFREQ
38                       EXTERN PAGE0 FLAG4
39                       EXTERN DIVIDE
40                       EXTERN CLRDATA,FADE,LABEL,CLRVDI
41              ;**************************************************
42 0000 07 00 7D REPORT  BRCLR  3,STAT,SEARCH ;GO IF NO TRIGGER
43
44              ;**************************************************
45              ; TRIGGER PRESSED (PINPOINTING MODE)                ;
46              ;**************************************************
47 0003 B6 00            LDA    DISPTR
48 0005 A1 1C            CMP    #28
```

PAGE 2

REPORT   07 FEB 89/modified 7/28/89   MDR

```
49  0007  26 69              BNE   JMR
50  0009  B6 00              LDA   SIGBAL
51  000B  44                 LSRA
52  000C  44                 LSRA
53  000D  40                 NEGA
54  000E  AB 14              ADD   #20
55  0010  97                 TAX         ;x in range 17 -- 20
56  0011  B6 00              LDA   TFREQ
57  0013  A0 04              SUB   #4
58  0015  2A 02              BPL   SCALE2
59  0017  40                 NEGA
60  0018  5C                 INCX
61  0019  27 04      SCALE2  BEQ   SCALE3
62  001B  5C                 INCX
63  001C  4A                 DECA
64  001D  20 FA              BRA   SCALE2
65  001F  0A 07 03   SCALE3  BRSET 5,STATTABL+7,SCALE4
66  0022  5C                 INCX
67  0023  5C                 INCX
68  0024  5C                 INCX
69  0025  B6 00      SCALE4  LDA   GHOT
70  0027  2A 01              BPL   SCALEIT
71  0029  4F                 CLRA
72  002A  A1 78      SCALEIT CMP   #120
73  002C  25 04              BLO   SCALIT2
74  002E  A6 13              LDA   #19
75  0030  20 0B              BRA   SHOWIT
76  0032  42         SCALIT2 MUL
77  0033  BF 00              STX   TEMA
78  0035  AE 07              LDX   #7
79  0037  34 00      SCLOOP  LSR   TEMA
80  0039  46                 RORA
81  003A  5A                 DECX
82  003B  26 FA              BNE   SCLOOP
83  003D  A1 13      SHOWIT  CMP   #19
84  003F  23 02              BLS   INDXOK
85  0041  A6 13              LDA   #19
86  0043  97         INDXOK  TAX
87  0044  A6 02              LDA   #2
88  0046  D7 00 0F           STA   DISTABL+15,X
89  0049  BF 00              STX   TEMA
90  004B  5C         MRKRLOOP INCX
91  004C  A3 14              CPX   #20
92  004E  24 10              BHS   BARIT
93  0050  D6 00 0F           LDA   DISTABL+15,X
94  0053  A1 20              CMP   #32
95  0055  27 09              BEQ   BARIT
96  0057  A6 A1              LDA   #A1H
97  0059  D7 00 0F           STA   DISTABL+15,X
98  005C  A3 13              CPX   #19
99  005E  25 EB              BLO   MRKRLOOP
100 0060  5F         BARIT   CLRX
101 0061  A6 02              LDA   #2
102 0063  B3 00      BARLOOP CPX   TEMA
103 0065  27 06              BEQ   DCPTST
104 0067  D7 00 0F           STA   DISTABL+15,X
105 006A  5C                 INCX
```

PAGE 3

REPORT   07 FEB 89/modified 7/28/89  MDR

```
106   006B   20 F6                    BRA     BARLOOP
107   006D   B6 00         DEPTST     LDA     PHASE
108   006F   02 08 60                 BRSET   1,STATTABL+8,SIGN?
109   0072   CC 01 EC      JWR        JMP     WRITE      ;UPDATE AUDIO & RTN
110   0075   A6 10         SETFADE    LDA     #16
111   0077   B0 00                    SUB     FADERATE ;1 (min) - 15 (max)
112   0079   48                       LSLA
113   007A   48                       LSLA
114   007B   48                       LSLA
115   007C   48                       LSLA
116   007D   B7 00                    STA     FADECOUNT
117   007F   81                       RTS
118                       ;**********************************************
119                       ; TRIGGER RELEASED (SEARCH MODE)               *
120                       ;**********************************************
121
122   0080   01 00 0D      SEARCH     BRCLR   0,STATE,NOFADE
123   0083   3D 00                    TST     FADERATE
124   0085   27 09                    BEQ     NOFADE
125   0087   3A 00                    DEC     FADECOUNT
126   0089   26 05                    BNE     NOFADE
127   008B   AD E8                    BSR     SETFADE
128   008D   CD 00 00                 JSR     FADE
129   0090   CD 00 00      NOFADE     JSR     DISFLT   ;UPDATE DOK
130                       ;check for valid time to do peak processes
131   0093   05 00 05                 BRCLR   2,STAT,NOTPK ;GO,NOT PEAK
132   0096   07 00 02                 BRCLR   3,FLAGA,NOTPK ;GO,NOT DOD
133   0099   20 12                    BRA     PEAK
134   009B   CD 00 00      NOTPK      JSR     LABEL
135   009E   C6 00 00                 LDA     VDI
136   00A1   A1 64                    CMP     #100     ;if overload or low bat showing
137   00A3   24 05                    BHS     JNP      ;..don't defeat label update
138   00A5   A6 66                    LDA     #102     ;"no label" code
139   00A7   C7 00 00                 STA     VDI
140   00AA   CC 01 70      JNP        JMP     NOTPK2
141                       ;**********************************************
142                       ; PEAK PROCESSES: DO AT PEAK OF EACH WAVE      *
143                       ;**********************************************
144   00AD   02 0A 08      PEAK       BRSET   1,STATTABL+10,NOCLEAR    ;test single sweep/accum.
145   00B0   01 00 05                 BRCLR   0,FLAG4,NOCLEAR
146   00B3   11 00                    BCLR    0,FLAG4
147   00B5   CD 00 00                 JSR     CLRDATA
148   00B8   AD BB         NOCLEAR    BSR     SETFADE
149   00BA   B6 00                    LDA     PHASE
150   00BC   C7 00 00                 STA     VDI
151   00BF   C7 00 00                 STA     IDTONE
152   00C2   05 08 0D                 BRCLR   5,STATTABL+8,SIGN?       ;skip test if vis. disc. off
153   00C5   00 00 0A                 BRSET   0,STAT,SIGN?             ;accept targ.?
154   00C8   CD 00 00                 JSR     CLRVDI
155   00CB   A6 67                    LDA     #103
156   00CD   C7 00 00                 STA     VDI
157   00D0   20 37                    BRA     SPECTM
158   00D2   2A 08         SIGN?      BPL     POSVDI
159   00D4   40                       NEGA
160   00D5   AE 2D                    LDX     #2DH
161   00D7   CF 00 01                 STX     DISTABL+1
162   00DA   20 05                    BRA     DOVNUM
```

PAGE 4

REPORT  07 FEB 89/modified 7/28/89  RDW

```
163  00DC  AE 20       POSVDI  LDX   #32
164  00DE  CF 00 01            STX   DISTABL+1
165  00E1  AE 0A       DBVNUM  LDX   #10
166  00E3  CD 00 00            JSR   DIVIDE
167  00E6  AB 30               ADD   #30H
168  00E8  C7 00 02            STA   DISTABL+2
169  00EB  9F                  TXA
170  00EC  AB 30               ADD   #30H
171  00EE  C7 00 03            STA   DISTABL+3
172  00F1  A6 2E               LDA   #2EH
173  00F3  C7 00 04            STA   DISTABL+4
174  00F6  B6 00               LDA   FHRAC
175  00F8  AB 30               ADD   #30H
176  00FA  C7 00 05            STA   DISTABL+5
177  00FD  A6 1C               LDA   #28
178  00FF  B7 00               STA   DISPTR
179  0101  1F 00               BCLR  7,FLAGA
180  0103  07 00 03            BRCLR 3,STAT,SPECTM
181  0106  CC 01 EC            JMP   WRITE
182  0109  5F          SPECTM  CLRX
183  010A  B6 00               LDA   PHASE
184  010C  AB 60               ADD   #96        ;ns'lize to -96 @ 0
185  010E  B7 00               STA   TEMA
186  0110  4F                  CLRA
187  0111  AB 0A       VLOOP   ADD   #10
188  0113  B1 00               CMP   TEMA
189  0115  24 03               BHS   DISBAR
190  0117  5C                  INCX
191  0118  20 F7               BRA   VLOOP
192  011A  04 0A 21    DISBAR  BRSET 2,STATTABL+10,AVERG
193
194                           ;"normal" mode -- scale bar height by gt amp.
195  011D  B6 00               LDA   GFAMP
196  011F  2A 01               BPL   COMP64
197  0121  40                  NEGA
198  0122  A1 6B       COMP64  CMP   #6BH
199  0124  25 04               BLO   COMP40
200  0126  A6 02               LDA   #2
201  0128  20 35               BRA   STASH
202  012A  A1 4B       COMP40  CMP   #4BH
203  012C  25 04               BLO   COMP18
204  012E  A6 03               LDA   #3
205  0130  20 2D               BRA   STASH
206  0132  A1 3B       COMP18  CMP   #3BH
207  0134  25 04               BLO   SHORT
208  0136  A6 04               LDA   #4
209  0138  20 25               BRA   STASH
210  013A  A6 5F       SHORT   LDA   #5FH
211  013C  20 21               BRA   STASH
212
213                           ;"average" mode -- count hits and show distribution
214  013E  D6 00 0F    AVERG   LDA   DISTABL+15,X
215  0141  A1 20               CMP   #20H
216  0143  26 04               BNE   COMP5F
217  0145  A6 5F               LDA   #5FH
218  0147  20 16               BRA   STASH
219  0149  A1 5F       COMP5F  CMP   #5FH
```

PAGE 5

REPORT  07 FEB 89/modified 7/28/89  MDR

```
220  014B  26 04                BNE     COMP2
221  014D  A6 04                LDA     #4
222  014F  20 0E                BRA     STASH
223  0151  A1 02       COMP2    CMP     #2
224  0153  26 09                BNE     NEXTSEG
225  0155  BF 00                STX     TEMA
226  0157  CD 00 00             JSR     FADE
227  015A  BE 00                LDX     TEMA
228  015C  A6 03                LDA     #3
229  015E  4A          NEXTSEG  DECA
230  015F  D7 00 0F    STASH    STA     DISTABL+15,X
231
232                   LEARN ;modify memory based upon [phase]
233  0162  0D 0A 05             BRCLR   6,STATTABL+10,LRN1 ;GG NOT LRNREJ
234  0165  CD 00 00             JSR     SET
235  0168  20 06                BRA     LRNEND
236  016A  0B 0A 03    LRN1     BRCLR   5,STATTABL+10,LRNEND ;GD,NOT LRNACC
237  016D  CD 00 00             JSR     CLR
238  0170               LRNEND
239
240  0170               NOTPK2
241                  ;************************************;
242                  ;  THE FOLLOWING OCCURS EVERY CYCLE  ;
243                  ;************************************;
244
245                  ;************************************;
246                  ;  WEIGHT GFLEV FOR NORMAL OR HIGH GAIN ;
247                  ;  IN:GFLEV (0-128)                  ;
248                  ;  OUT:A,TEMA=WEIGHTED GFLEV (0-128) ;
249                  ;************************************;
250  0170  B6 00                LDA     GFLEV
251  0172  27 0A                BEQ     WGFEND   ;STAY AT 0 IF 0
252  0174  BE 00                LDX     ACSENS
253  0176  A3 41                CPX     #65
254  0178  24 04                BHS     WGFEND
255  017A  44                   LSRA
256  017B  26 01                BNE     WGFEND
257  017D  4C                   INCA
258  017E  B7 00       WGFEND   STA     TEMA
259                  ;************************************;
260                  ;  ATIME CONTROL SYSTEM              ;
261                  ;  IN:2,FLAGA (ATH) RESETS ATIME     ;
262                  ;OUT:5,FLAGB SET IF ATIME RUNNING    ;
263                  ;************************************;
264  0180  1B 00                BCLR    5,FLAGB  ;ASSUME NO ATIME
265  0182  05 00 07             BRCLR   2,FLAGA,NOATH
266                   ;if ath detected, reset atime with app. value
267  0185  A6 32                LDA     #50
268  0187  B0 00                SUB     RECOV    ; 40 (max) - 1 (min)
269  0189  44                   LSRA             ;range: 5 - 24
270  018A  B7 00                STA     ATIME
271  018C  3D 00       NOATH    TST     ATIME    ;CHECK IF RUNNING
272  018E  26 04                BNE     DECIT
273  0190  10 00                BSET    0,FLAG4
274  0192  20 04                BRA     ATEND
275  0194  3A 00       DECIT    DEC     ATIME    ;SERVICE ATIME &
276  0196  1A 00                BSET    5,FLAGB  ; SET FLAG
```

PAGE 6

REPORT    07 FEB 89/modified 7/28/89  MDR

```
277  0198                        ATEND
278                              ;****************************************
279                              ; DECREASE DISLEV UNLESS ATIME
280                              ;OUT:DISLEV=0 IF ATIME OVER
281                              ;****************************************
282                              ;skip decrease if atime running
283  0198  0A 00 06                     BRSET  5,FLAGB,DECEND  ;GO IF ATIME
284  019B  37 00                        ASR    DISLEV
285  019D  2A 02                        BPL    DECEND
286  019F  3C 00                        INC    DISLEV          ;FORCE NEG CONVERGENCE
287  01A1                        DECEND
288                              ;****************************************
289                              ; ADD GFLEV TO DISLEV                    ;
290                              ; IN: DISLEV (SB)                        ;
291                              ; IN:TEMA=WEIGHTED, (OB)                 ;
292                              ;****************************************
293                              ;skip add if not atime
294  01A1  0B 00 37                     BRCLR  5,FLAGB,ADDEND
295                              ;get ready, and branch to appropriate routine
296  01A4  B6 00             ADDUP LDA    DISLEV
297  01A6  AB 80                   ADD    #80H            ;A=DISLEV (OB)
298  01A8  00 00 16                BRSET  0,STAT,ACC ;GO IF ACCEPT
299                              ;reject target... A=dislev-adj gflev,clip @ 0
300  01AB  00 00 0E                BRSET  0,FLAGP,SUBIT   ;test ac overload
301  01AE  0E 00 05                BRSET  7,PHASE,SUBIT   ;don't bias pos. phase reponses
302  01B1  97                      TAX                    ;x has dislev
303  01B2  B6 00                   LDA    BCREJ           ;1 (min) - 20 (max)
304  01B4  44                      LSRA                   ;0 - 10
305  01B5  B1 00                   CMP    TEMA            ;clip?
306  01B7  25 02                   BLO    GFOK
307  01B9  B7 00                   STA    TEMA            ;clip above min. neg. excursion
308  01BB  9F                GFOK  TXA
309  01BC  B0 00             SUBIT SUB    TEMA            ;A=DISLEV-ADJ GFLEV (OB)
310  01BE  24 17                   BCC    NOCLIP          ;CLIP IF OVERFLOW
311  01C0  4F                      CLRA                   ;CLIP @ 0
312                              ;accept target... A=dislev+adj gflev
313  01C1  00 00 0B          ACC   BRSET  0,FLAGP,ADDIT   ;test ac overload
314  01C4  97                      TAX                    ;x has dislev
315  01C5  A6 18                   LDA    #24             ;bcrej: 1 (min) - 20 (max)..
316  01C7  B0 00                   SUB    BCREJ           ;23 - 4
317  01C9  48                      LSLA                   ;46 (min) - 8 (max)
318  01CA  B1 00                   CMP    TEMA            ;clip?
319  01CC  22 02                   BHI    GFOK2
320  01CE  B7 00                   STA    TEMA            ;clip below max. pos. excursion
321  01D0  9F                GFOK2 TXA
322  01D1  BB 00             ADDIT ADD    TEMA
323                              ;clip at full scale
324  01D3  24 02                   BCC    NOFS            ;CLIP IF OVERFLOW
325  01D5  A6 FF                   LDA    #0FFH
326  01D7                    NOFS
327                              ;finish processing A into dislev....
328  01D7                    NOCLIP
329  01D7  A0 80                   SUB    #80H            ;CONVERT SB
330  01D9  B7 00                   STA    DISLEV          ;POSSIBLY REDUNDANT
331  01DB                    ADDEND
332                              ;****************************************
333                              ; RIG UP DON AND DOD FROM DISLEV         ;
```

PAGE 7

REPORT   07 FEB 89/modified 7/28/89  MDR

```
334                         * IN:   DISLEV                             *
335                         *OUT: DOD=1 IF ¦DISLEV¦>VDISENS(DATA PRESENT)*
336                         *OUT: DON=1 IF DISLEV >0 (ACCEPT)           *
337                         ********************************************
338   01DB  18 00           BSET   4,FLAGA  ;DON (SET IF ACCEPT)
339   01DD  17 00           BCLR   3,FLAGA  ;DOD (SET IF DISC ON)
340   01DF  2A 03           BPL    RPT1     ;GO IF PLUS
341   01E1  40               NEGA
342   01E2  19 00            BCLR   4,FLAGA  ;DON CLEAR=REJ
343   01E4  BB 00     RPT1   ADD    VDISENS  ;vdi sens.: 1 (min) - 79 (max)
344   01E6  A1 64            CMP    #100
345   01E8  25 02            BLO    RPT2     ;GO IF <THRESHOLD
346   01EA  16 00            BSET   3,FLAGA  ;DOD: ENABLE DISCRIM.
347   01EC            RPT2
348                         ********************************************
349                         * ALWAYS UPDATE AUDIO AND DISPLAY.          *
350                         ********************************************
351   01EC            WRITE
352   01EC  CD 00 00         JSR    AUDIO    ;DO AUDIO
353   01EF  81               RTS             ;END OF REPORT
354                         ********************************************
355   01F0                   END
```

PAGE 2

REPORT 07 FEB 89/modified 7/28/89 MBR

##### CROSS REFERENCE TABLE ###########

| Name | Addr | | References |
|---|---|---|---|
| ACC | 01C1 | : | 298 |
| ACSENS | EXTERN | : | 252 |
| ADDEND | 0109 | : | 294 |
| ADDIT | 0101 | : | 313 |
| ADDUP | 01A4 | : | |
| ATEND | 0198 | : | 274 |
| ATIME | EXTERN | : | 270 271 275 |
| AUDIO | EXTERN | : | 352 |
| AVCOUNT | EXTERN | : | |
| AVERG | 013E | : | 192 |
| BARIT | 0060 | : | 92 95 |
| BARLOOP | 0053 | : | 106 |
| BCREJ | EXTERN | : | 303 316 |
| CLR | EXTERN | : | 237 |
| CLRDATA | EXTERN | : | 147 |
| CLRVDI | EXTERN | : | 154 |
| COMP18 | 0132 | : | 203 |
| COMP2 | 0151 | : | 220 |
| COMP40 | 012A | : | 199 |
| COMP5F | 0149 | : | 216 |
| COMP64 | 0122 | : | 196 |
| OCPTST | 006B | : | 103 |
| DECEND | 01A1 | : | 283 285 |
| DECIT | 0194 | : | 272 |
| DISBAR | 011A | : | 189 |
| DISFLT | EXTERN | : | 129 |
| DISLEV | EXTERN | : | 284 286 296 330 |
| DISPTR | EXTERN | : | 47 178 |
| DISTABL | EXTERN | : | 88 93 97 104 161 164 168 171 173 176 214 230 |
| DIVIDE | EXTERN | : | 166 |
| DOVNUM | 00E1 | : | 162 |
| FADE | EXTERN | : | 128 226 |
| FADECOUNT | EXTERN | : | 116 125 |
| FADERATE | EXTERN | : | 111 123 |
| FLAGA | EXTERN | : | 145 146 175 273 |
| FLAGA | EXTERN | : | 132 265 338 339 342 346 |
| FLAGB | EXTERN | : | 264 276 283 294 |
| FLAGP | EXTERN | : | 300 313 |
| GCOUNT | EXTERN | : | |
| GDC | EXTERN | : | |
| GFAMP | EXTERN | : | 195 |
| GFLEV | EXTERN | : | 250 |
| GFOK | 01BB | : | 306 |
| GFOK2 | 01D0 | : | 319 |
| GHOT | EXTERN | : | 69 |
| IDTONE | EXTERN | : | 151 |
| INDXOF | 0043 | : | 54 |
| JNP | 00AR | : | 137 |
| JNR | 0072 | : | 49 |
| KEY | EXTERN | : | |
| LABEL | EXTERN | : | 134 |
| LEARN | 0162 | : | |
| LRN1 | 0164 | : | 233 |
| LRNEND | 0170 | : | 235 236 |

PAGE 9

REPORT   07 FEB 99/modified 7/28/89   MOR

```
MRKRLOOP   004B  :    99
NEXTSEG    015E  :   224
NOATH      0180  :   265
NOCLEAR    0068  :   144   145
NOCLIP     01B7  :   310
NOFADE     0090  :   122   124   126
NOFS       0187  :   324
NOTPK      009B  :   131   132
NOTPK2     0170  :   140
OPTST     EXTERN :
PEAK       00A9  :   133
PHASE     EXTERN :   107   149   183   301
PHRAD     EXTERN :   174
POSVBI     00DC  :   158
RECOV     EXTERN :   268
REPORT     0000  :     7
RPT1       01E4  :   340
RPT2       01EC  :   345
SCALE2     0019  :    58    64
SCALE3     001F  :    61
SCALE4     0025  :    65
SCALEIT    002A  :    70
SCALIT2    0032  :    73
SCLOOP     0037  :    82
SEARCH     0050  :    42
SET       EXTERN :   234
SETFADE    0075  :   127   148
SHORT      013A  :   207
SHOWIT     003D  :    75
SIGNAL    EXTERN :    50
SIGN?      00D2  :   108   152   153
SPECTM     0109  :   157   180
STASH      015F  :   201   205   209   211   218   222
STAT      EXTERN :    42   131   153   180   298
STATE     EXTERN :   122
STATTABL  EXTERN :    65   108   144   152   192   233   236
SUBIT      01BC  :   300   301
TEMA      EXTERN :    77    79    89   102   185   188   225   227   258   305   307   309
318
                     320   322
TFREQ     EXTERN :    56
VBI       EXTERN :   135   139   150   156
VBIAV     EXTERN :
VBISENS   EXTERN :   343
VLOOP      0111  :   191
WGFEND     017E  :   251   254   256
WRITE      01ED  :   109   181

LINES ASSEMBLED :  355        ASSEMBLY ERRORS :   0
```

What is claimed is:

1. A method of displaying signal information on a display associated with a metal detector having a receive signal, comprising the steps of:
   (a) establishing a plurality of display unit addresses wherein each said address can display a plurality of display characters up to a maximum number;
   (b) detecting a local maxima of an amplitude associated with said receive signal;
   (c) determining and quantifying a phase angle associated with said receive signal when said local maxima is detected;
   (d) converting said phase angle into a write address associated with one of said display unit addresses;
   (e) reading a number of display characters at said write address; and
   (f) increasing the number of display characters at said write address if the number of display characters at said write address is less than said maximum number and, alternatively, when the number of display characters at said write address is equal to said maximum number, then decreasing the number of display characters at all addresses having display characters except the write address.

2. The method of claim 1 wherein step (b) comprises detecting only local maxima that exceed a predetermined threshold.

3. A display in a metal detector for graphically displaying information associated with a receive signal, comprising:
   (a) means for receiving a phase angle value associated with said receive signal;
   (b) means for receiving a signal amplitude value associated with said receive signal, said amplitude value being time-correlated with said phase angle value; and
   (c) microprocessor means for grouping said phase angle value into a selected one of a plurality of respective ranges of phase angle values and causing said selected one of said phase angle ranges and said signal amplitude value to appear instantaneously and simultaneously on said display.

4. In a metal detector having a transmit coil and a receive coil, said transmit coil transmitting a transmit signal which is acted upon by perturbations and said receive coil receiving the acted-upon transmit signal as a receive signal, the improvement comprising:
   (a) said receive signal having a phase angle value which is a measurement of a phase angle between said transmit signal and said receive signal, and further having a signal amplitude value associated with the strength of said receive signal, said amplitude value being time-correlated with said phase angle value; and
   (b) a visual display having a plurality of display unit addresses wherein each address corresponds to a range of phase angle values for instantaneously displaying said signal amplitude value at one of said plurality of display unit addresses corresponding to said phase angle values.

5. The metal detector of claim 4 wherein said visual display is a liquid crystal display.

6. A display method for graphically displaying signal information associated with a metal detector, comprising the steps of:
   (a) displaying a plurality of phase angles associated with said signal information simultaneously on a display, wherein said phase angles are the phase angles between transmit signals and receive signals produced by said metal detector; and
   (b) instantaneously displaying a time-correlated signal amplitude representative of the strength of said signal information and associated with a particular phase angle, and simultaneously said time-correlated signal amplitude with said plurality of phase angles on said display when said signal amplitude exceeds a predetermined threshold value.

7. The method of claim 6, further comprising the step of displaying said signal amplitude simultaneously with said plurality of phase angles as a bar graph.

8. A method of displaying signal information associated with a pass of a metal detector, comprising the steps of:
   (a) establishing a receive signal amplitude threshold;
   (b) detecting each occurrence that the receive signal exceeds said threshold in said pass;
   (c) counting the number of said occurrences;
   (d) displaying said number of occurrences on a display unit; and
   (e) detecting phase angle associated with said receive signal when said receive signal exceeds said threshold and simultaneously displaying said phase angle and said number of occurrences.

9. The method of claim 8 wherein said number of occurrences and said phase angle are displayed, one as a function of the other, on a two-axes visual display device.

10. The method of claim 8 wherein said number of occurrences is resolved into a correlative number of predetermined ranges of numbers corresponding to a number of display characters on said display unit.

* * * * *